United States Patent [19]

Kawasaki et al.

[11] 4,226,521

[45] Oct. 7, 1980

[54] CAMERA APERTURE CONTROLLING BRAKE

[75] Inventors: Masahiro Kawasaki, Tokyo; Yukio Takaoka, Asaka, both of Japan

[73] Assignee: Asahi Kogaku Kogyo Kabushiki Kaisha, Tokyo, Japan

[21] Appl. No.: 973,284

[22] Filed: Dec. 26, 1978

[30] Foreign Application Priority Data

Dec. 27, 1977 [JP] Japan .......................... 52/178890[U]

[51] Int. Cl.³ .............................................. G03B 9/06
[52] U.S. Cl. ................................................... 354/271
[58] Field of Search .................... 354/23 D, 36, 38, 43, 354/44, 270, 271, 29, 30

[56] References Cited

U.S. PATENT DOCUMENTS

| | | | |
|---|---|---|---|
| 3,820,131 | 6/1974 | Tanaka .................................... | 354/38 |
| 3,921,186 | 11/1975 | Lermann ................................ | 354/43 |
| 4,139,290 | 2/1979 | Takaoka et al. ................. | 354/271 X |
| 4,149,785 | 4/1979 | Takaoka et al. ................. | 354/271 X |

*Primary Examiner*—John Gonzales
*Assistant Examiner*—W. J. Brady

*Attorney, Agent, or Firm*—Sughrue, Rothwell, Mion, Zinn and Macpeak

[57] ABSTRACT

An aperture auxiliary brake control device in a camera in which a speed slowing device operates in association with the lens stopping-down operation. The operation of the speed slowing device is stopped by interrupting the supply of current to an aperture control magnet to selectively employ a shutter priority automatic exposure in which an aperture value control is obtained, an aperture priority automatic exposure, or a manual exposure. The aperture auxiliary brake control device comprises a brake section for braking a brake disk secured to a part of the speed slowing device by interrupting the supply of current to an auxiliary brake magnet. An auxiliary brake magnet control circuit is employed so that only in the shutter priority automatic exposure mode the brake disk is braked before the operation of said speed slowing device is ended. In the aperture priority automatic exposure or in the manual exposure modes, the supply of current to the auxiliary brake magnet is interrupted after a period of time elapses required to stop down the lens to a minimum aperture value thereof. Hence, following this period an auxiliary brake is not applied.

6 Claims, 8 Drawing Figures

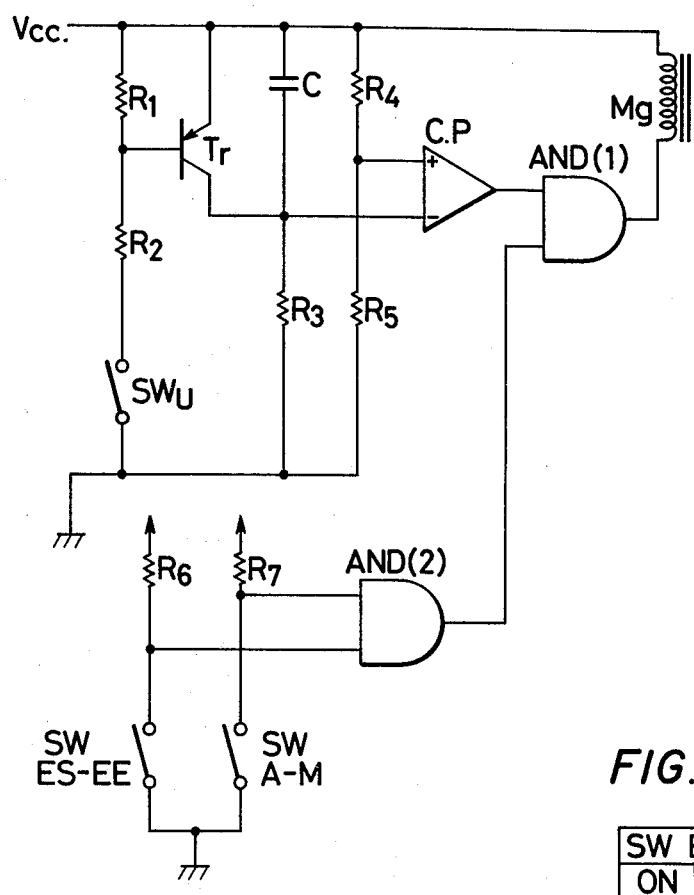

CAMERA APERTURE CONTROLLING BRAKE

BACKGROUND OF THE INVENTION

This invention relates to an aperture auxiliary brake control device in a camera which can selectively employ a shutter priority automatic exposure (EE), an aperture priority automatic exposure (ES) and a manual exposure mode of operation.

In a conventional aperture control type automatic exposure camera, light from an object, passes through the opening of the aperture, is measured while the aperture of the lens is being stopped down from the full-aperture, and when the aperture opening is stopped down to an aperture value suitable for predetermined shutter spaced and film sensitivity, the aperture stopping-down operation is stopped. This automatically determines the aperture opening. If in this conventional camera the stopping-down operation is carried out only with the lens, then the operation time required for stopping down the full-aperture to the suitable aperture value is too short to terminate the stopping-down operation with high accuracy. In order to overcome this difficulty, a speed slowing mechanism is interlocked with an operating member which is operated in association with the stopping-down operation.

However, the amount of movement of the aperture release plate of the lens is, in general, relatively small for aperture values close to the minimum aperture value. Therefore even if a speed slowing mechanism for moving the aperture release plate substantially at an equal speed is interlocked therewith, the quantity of light is abruptly changed for aperture values close to the minimum aperture value. Accordingly, in the case when the aperture release plate of the lens is moved substantially at an equal speed and the time required for stopping down the aperture from the full-aperture is not sufficiently long, the time per EV becomes excessively short for aperture values close to the minimum aperture value. Therefore, it is difficult to achieve the control with high accuracy.

However, if the above-described operating time is sufficiently long, the time interval which elapses from the release of the camera until the operation of the shutter starts also becomes long. Accordingly, in this case, the photographer may not be able to take for example a high speed picture he desires because the shutter will run after the picture has taken place. In order to overcome this drawback, a brake member is provided to apply a brake force to the speed slowing mechanism before the operation of the speed slowing mechanism is terminated.

On the other hand, if the correct aperture value is obtained while the lens is stopped down from the full-aperture to the minimum aperture value, the stopping-down operation is stopped when the correct aperture value is obtained. Simultaneously, the top curtain is unlocked to run, and the exposure is carried out. However, in the case where the correct aperture value cannot be obtained even if the stopping-down operation is carried out from the full-aperture to the minimum aperture value, no signal for stopping the stopping-down operation is provided. Therefore the top curtain is not unlocked to run and the operation of the camera is stopped.

In order to eliminate this difficulty, an interlocking timer circuit is provided which releases the locking of the top curtain a short time after the lens stopping-down operation is completed. This interlocked timer circuit will operate in the aperture priority automatic exposure or in the manual exposure since, in these two modes the aperture is not controlled. The time set by the interlocking timer is somewhat longer than the stopping-down operation time in order to reduce the delay in shutter operation. However, it is impossible to make the set time any longer. In a situation where the lens stopping-down operation becomes slow because the lens is used at a low temperature such as $-20°$ C. or $-30°$ C. or it is old, sometimes the lens stopping-down operation is stopped by the interlocking timer before the lens is stopped down to the minimum aperture value. In the (EE) operation where the aperture is controlled, an aperture value of F11 may be, in practice, instead of the correct value of F22. However, in the (ES) operation or manual exposure modes in which an aperture value has been specified, the aperture value has been intentionally set to by the operation F22. Therefore, if the aperture value is not the proper value, F22, but F11 in the (EE) mode, then the depth of field is changed greatly, and the intended picture cannot be obtained.

SUMMARY OF THE INVENTION

In view of the foregoing, an object of this invention is to provide a camera in which even if the lens stopping-down operation becomes slower due to variations in temperature or because the lens is old, the lens can still be stopped down to the minimum aperture value.

It is another object of this invention to define an aperture brake control device that in the shutter priority mode the brake disk will be actuated before operation of the lens stopping down speed slowing device has ended.

Yet another object of this invention is to define an auxiliary brake control device wherein in the aperture priority or manual modes of operation the current supply to the auxiliary brake magnet is suspended after a predetermined period of time to disable the brake.

Still another object of this invention is to provide an improved camera system usable over a wide range of operational conditions.

These and other objects of this invention are accomplished with an aperture auxiliary brake control system that is selectively actuated.

An aperture auxiliary brake control device in the camera has a speed slowing device operating association with a lens stopping-down operation. The operation of the speed slowing device is stopped by interrupting the supply of current to an aperture control magnet to selectively employ various modes of operation such as shutter priority automatic exposure in which an aperture value control is effected, aperture priority automatic exposure, a manual exposure. A brake section is used for braking a brake disc secured to a part of the speed slowing device by interrupting the supply of current to an auxiliary brake magnet. An auxiliary brake magnet control circuit allows selective actuation so that only in the shutter priority automatic exposure mode will brake disk be braked before the operation of said speed slowing device is complete. In the other modes of operation aperture priority automatic exposure or manual exposure, the supply of current to said auxiliary brake magnet is interrupted after it passes a predetermined period of time required to stop down the lens to a minimum aperture value thereof and the auxiliary brake is not applied.

One embodiment of this invention will be described in detail with reference to the accompanying drawings.

BRIEF DESCRIPTION OF THE DRAWINGS

FIG. 7 is a circuit diagram showing an auxiliary brake circuit; and

FIG. 8 is a diagram showing relations between switch position and mode.

DESCRIPTION OF THE PREFERRED EMBODIMENT

Figure 1:
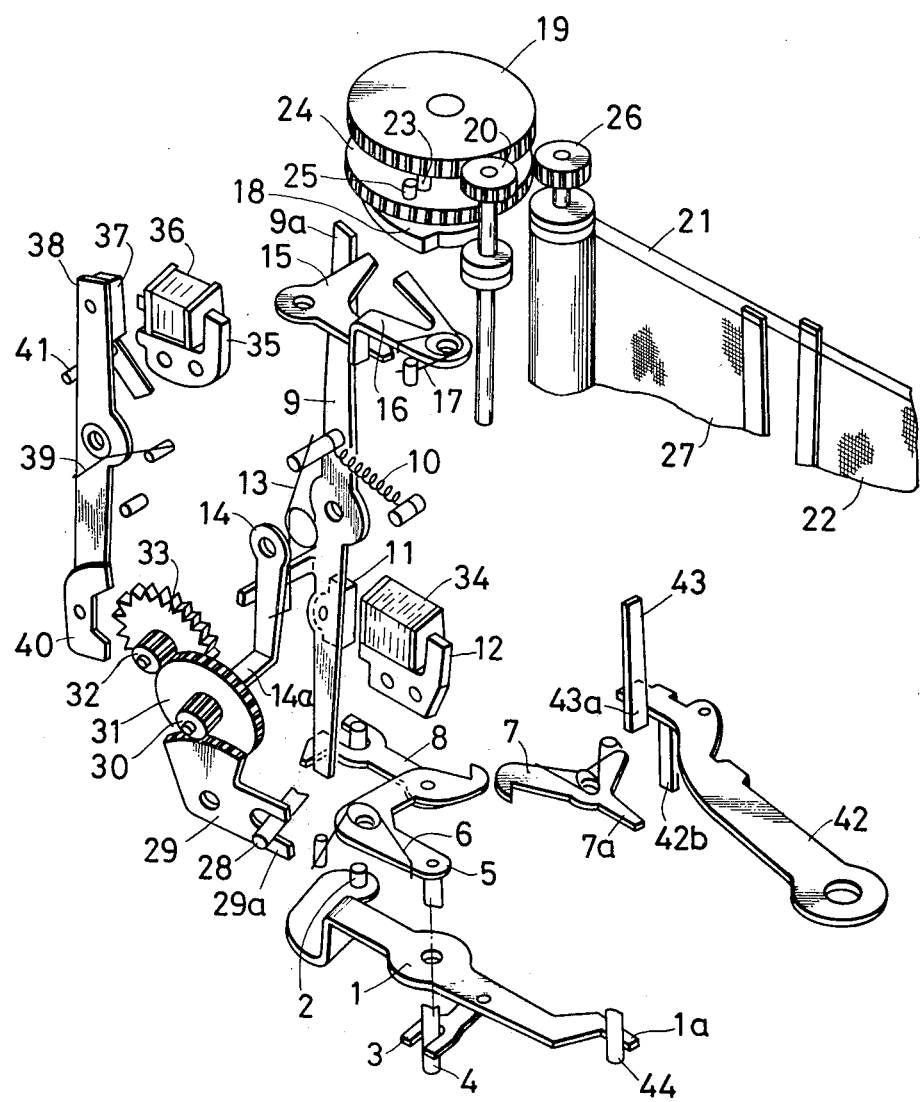
FIG. 1 is a perspective view showing an aperture control section and a top curtain locking section according to this invention.
Figure 2:
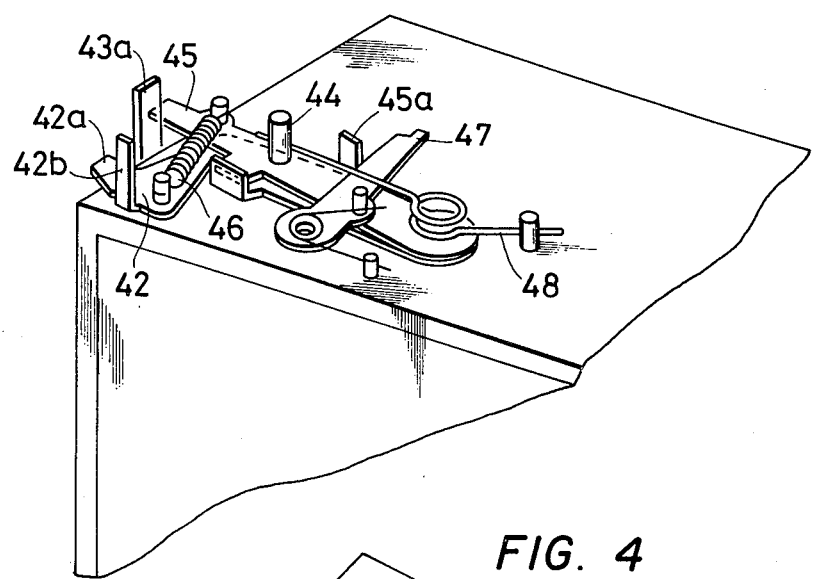
FIG. 2 is a perspective view showing a mirror box mechanism on the lower part of the body of a camera.
Figure 3:
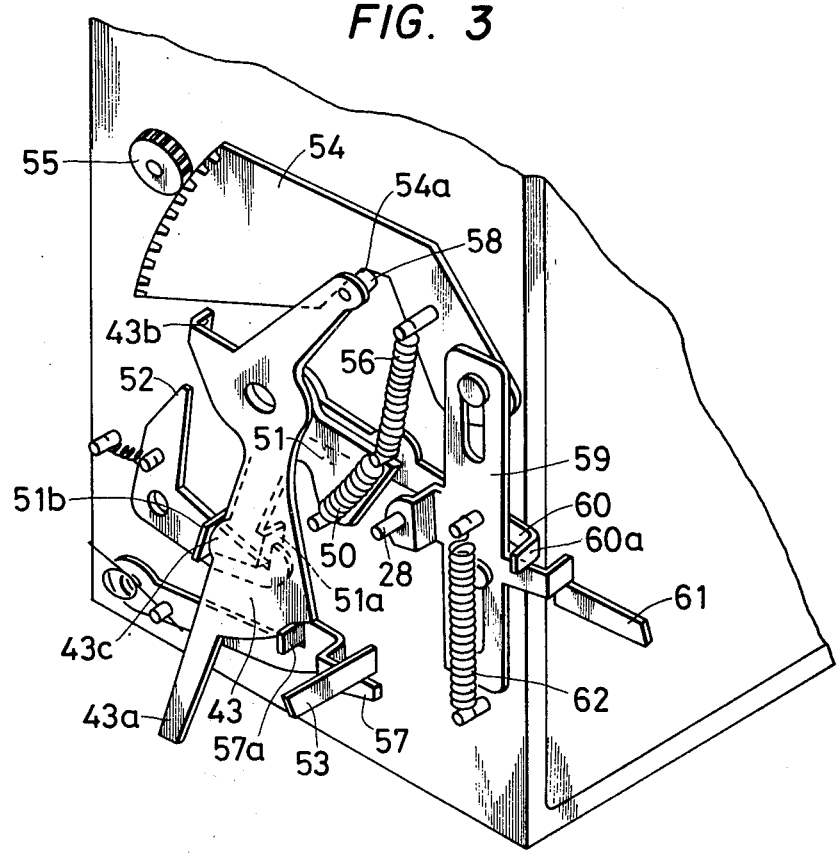
FIG. 3 is a perspective view showing the mirror box mechanism on the side of the camera body.

Referring now to FIGS. 1-3 various operations concerning the winding mechanism will be described.

(a) Charging of a locking member

A cam of a winding mechanism (not shown) and a pin 2 of a charge lever 1 abut against each other. Therefore, the charge lever 1 is turned clockwise by the winding operation. As a result, a set lever 5 is turned clockwise against the elastic force of a spring 6 by means of a fork-shaped lever 3 which is rotatably connected to the charge lever. Therefore, an auxiliary set lever 8 connected rotatably to the set lever 5 is displaced to the right, as viewed in FIG. 1. This causes the operating lever 9 to turn counterclockwise against the elastic force of a spring 10. As a result, an armature 11 mounted pivotally on the operating lever 9 is brought into contact with the iron core 12 of an aperture control magnet 34 which is fixedly secured to the body of the camera. At the same time, a control lever 14 which is elastically coupled to the operating lever 9 by means of a spring 13 is turned counterclockwise. This causes a locking section 14a of the control lever 14 to be disengaged from a star wheel 33 in the final stage of a speed slowing mechanism.

On the other hand, because one end portion 9a of the operating lever 9 is displaced, a top curtain locking lever 16 is turned clockwise via a relay lever 15 with the aid of a spring 17. It is then held to be ready for engaging a top curtain cam 26. An ankle lever 38 is turned clockwise against the elastic force of a spring 39 by a pin 41 embedded in a lever (not shown) which is engaged with the auxiliary set lever 8. As a result, an armature 37 mounted pivotally on the ankle lever 38 is brought into contact with the iron core 35 of an auxiliary brake magnet 36. An ankle 40 is accordingly retracted from the star wheel 33.

When the armatures 11 and 37 are brought into contact with the iron cores 12 and 35, respectively, the set lever is engaged with the locking lever 7. The winding cam is set so that in this case the displacement of the charge lever is maximum. Therefore, in the subsequent winding operation, the winding cam is set so that the charge lever 1 is turned counterclockwise to be restored. Therefore, the fork-shaped lever 3 is restored leaving the pin 4.

(b) Charging of shutter curtains

With the winding operation, an upper speed changing gear 19 engaged with a gear in the winding mechanism (not shown) is turned. A top curtain 22 is wound via a pulling element 21 by a top curtain pinion 20 engaged with the speed changing gear 19. Hence, the top curtain 22 is charged. On the other hand, a lower speed changing gear 24 is turned by means of a pin 23 embedded in the upper speed changing gear 19 and a pin 25 embedded in the lower speed changing gear 24. A bottom curtain 27 is wound by a bottom curtain pinion 26. In this manner, the bottom curtain 27 is charged.

A top curtain locking cam 18 combined integrally with the speed changing gear 19 is positioned so that, when the winding operation has been completed, it engages the aforementioned top curtain locking lever 16. Hence, the top curtain locking cam 18 is locked upon completion of the winding operation.

(c) Charging of a mirror box mechanism

The charge lever 1 is turned clockwise by the winding operation (FIG. 1). In this case, since pin 44, which engages one end portion 1a of the charge lever 1, is fixedly secured to a driving lever 45 as shown in FIG. 2, the driving lever 45 is turned clockwise while energizing a restoring spring 48 and a mirror elevating spring 46. As a result a locking section 45a of the driving lever 45 is engaged with a second locking lever 47. The mirror box mechanism is then charged. The clockwise turning of the driving lever 45 causes a first operating lever 42 to turn clockwise via the mirror elevating spring 46.

In addition, one end portion 42a of the first operating lever 42 imparts a force to one end portion 43a of a second operating lever 43 to displace the one end portion to the right as viewed in FIG. 3. However, the second operating lever 43 is locked by a bent portion 57a of a first locking lever 57, and therefore the mirror elevating spring is energized.

On the other hand, a lens aperture release plate 61 is at all times energized in the stopping-down direction, or upwardly in FIG. 3, while a slide plate 59 engaging the aperture release plate 61 tends to displace itself against the elastic force of a restoring spring 62. It is however detained by a bent portion 60a of a restoring lever 60. This restoring lever 60 is coupled to a lever 51 by means of a coupling spring 50. A bent portion 51a of the lever 51 is locked by a third locking lever 52.

These activities constitute the winding mechanisms in the camera have been described. The aspects of operation associated with optics and their adjustment will now be described.

(d) Speed slowing mechanism

A coupling pin 28 in FIG. 1 is operated in association with an aperture release plate 61 (FIG. 3) on the lens side through the slide plate 59. It is engaged with an elongated groove 29a of the sector-shaped gear 29. The sector-shaped gear 29 engages a first pinion gear 30, and the operation of the gear 29 is transmitted through a spur 31 and a second pinion gear 32 to the star wheel 33. Thus, the object of this speed slowing mechanism is to improve the control accuracy by enlarging the amount of displacement of the lens aperture release plate 61. It also improves the durability by reducing the locking force.

A one-way clutch is provided between the first pinion gear 30 and the spur gear 31, so that, when the coupling pin 28 is moved upwardly as viewed in FIG. 1, the first pinion gear 30 and the spur gear 31, being formed as one unit, rotate the star wheel 33. When the star wheel has been locked, the coupling pin 28 can be returned to its lower position thereby to restore the aperture to the full-aperture.

(e) Camera operation

The operation, starting from the release operation, of the camera will now be described. The release lever 53 is moved downwardly as viewed in FIG. 3 in association with the depression of a release button (not shown). As a result the first locking lever 57 is turned clockwise and is disengaged from the section operating lever 43. Therefore, the first operating lever 42 is turned clockwise, as viewed in FIG. 2, by the mirror elevating spring 46, to cause the second operating lever 43 to turn counterclockwise as viewed in FIG. 3.

The second operating lever 43 is brought into contact with the cam section 54a of the mirror elevating lever 54 via a pin 44 fixedly secured to the second operating lever 43. This turns the mirror elevating lever 54 clockwise, to turn counterclockwise a mirror elevating gear engaged with a gear provided at the end portion of the mirror elevating lever 54, and to elevate a mirror (not shown). At the end of the operation of the second operating lever 43, or at the end of the elevation of the mirror, the bent portion 43b of the second operating lever 43 kicks the third locking lever 52 to turn the latter 52 clockwise. This releases the locking of the lever 51.

In this case, both the lever 51 and the restoring lever 60 are instantaneously turned couterclockwise by the spring 56. As a result, the slide plate 59 having been held by the restoring lever 60 starts to move upwardly and the lens is stopped down. Also, the coupling pin 28 is operated to allow the speed slowing mechanism (FIG. 1) to start its operation. On the other hand, as shown in FIG. 1, the set lever 5 has been locked by the locking lever 7 as a consequence of the winding operation.

However, because the first operating lever 42 in the mirror box mechanism is turned by the release operation of the camera, the bent portion 42b of the first operating lever 42 kicks one end portion 7a of the locking lever 7. Therefore, the set lever 5 is instantaneously turned counterclockwise and restored by means of the spring 6, while the operating lever 9 and the ankle lever 38 tend to turn. However, the turning of these levers 9 and 38 is prevented because the aperture control magnet 34 and the auxiliary brake magnet 36 have been energized to attract the armatures 11 and 37, respectively, in this case.

The supply of current to the auxiliary brake magnet 36 is interrupted a short time after the start of operation of the speed slowing mechanism. Therefore, the attraction of the armature 37 is released. As a result, the ankle lever 38 is turned counterclockwise by the spring 39, and the ankle 40 engages the star wheel 33 so that the auxiliary brake is actuated. Therefore, the aperture blades are slowly moved by the speed slowing mechanism and the auxiliary brake to stop down the lens.

The system for controlling an aperture value in response to variations in the quantity of incident light which are caused by stopping down the aperture, will now be described.

Figure 4:
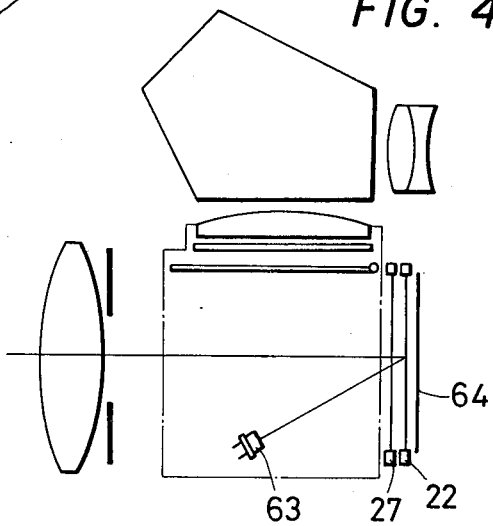
FIG. 4 is a sectional view showing the arrangement of a light receiving element.

A new-finder observing mirror has already been elevated. A light receiving element 63 is provided out of the photographing incident light path as shown in FIG. 4. A reflection treatment is applied to the photographing lens side of the top curtain 22 so that the light receiving element 63 receives the light which has passed through the photographing lens and reflected by the top curtain 29.

An APEX calculation $B_V - A_V$ is optically carried out according to the brightness of an object and the variation in the quantity of light due to the stopping-down operation. Then, the value $S_V$ of film sensitivity previously set is added to the result of this calculation. That is, the calculation of shutter speed, $T_V = S_V + B_V - A_V$ is carried out. The value $T_V$ varies with the value $B_V - A_V$ which is varied as the stopping-down operation is advanced. The value $T_V$ is compared with the value $T_V$ of a manually set shutter speed. When the calculated value $T_V$ coincides with the manually set value $T_V$, the supply of current to the aperture control magnet 34 is interrupted.

Consequently, the armature 11 is disengaged from the iron core 12, and the operating lever 9 is therefore turned clockwise by the spring 10. In this case, the elastically coupled control lever 14 is also turned clockwise to engage the star wheel 33 in the speed slowing mechanism. As a result the operation of the lens aperture release plate 61 is stopped via the coupling pin 28 and the slide plate 59 and the stopping-down operation is stopped at a suitable value. As the operating lever is further turned clockwise, its one end portion 9a kicks the relay lever 15 to disengage the top curtain locking lever 16 from the top curtain locking cam 18 so that the top curtain starts running.

Thereafter, the bottom curtain 27 is run in a period of time set by an exposure time adjusting mechanism (not shown). At the end of the run of the bottom curtain, the pin 47a fixedly secured to the second locking lever 47 (FIG. 2) is kicked to turn the latter 47 clockwise. Hence, the locking of the driving lever 45 is released. As a result, the driving lever 45 is restored by means of the restoring spring 48 and the second operating lever 43 is restored.

In FIG. 3, a protrusion 43c of the second operating lever 43 depresses a bent portion 51b of the lever 51, to restore the restoring lever 60 with the aid of the coupling spring 50. Accordingly, the slide plate 59 is restored, and the lens aperture is therefore restored to its full-aperture. In this case, the speed slowing mechanism has been locked. However, because the one-way clutch is provided between the first pinion gear 30 and the spur gear 31 as described before, the slide plate can be restored. The mirror elevating lever 54 is restored by means of the spring 56, and the mirror is restored. The lever 51 is engaged with the third locking lever 49. Thus, all of the necessary camera operations have been achieved.

The camera operation just described in the case where a correct aperture value can be obtained before the lens is stopped down to its minimum aperture value. In the case where a correct aperture value is not available before the lens is stopped down to its minimum aperture value, or in the case of the ES or the manual exposure modes of operation in which the aperture is not controlled, the supply of current to the aperture control magnet is interrupted by the above-described interlocking timer. This unlocks the top curtain, to allow the top curtain to run, and to thereby start the exposure operation.

Figure 5:
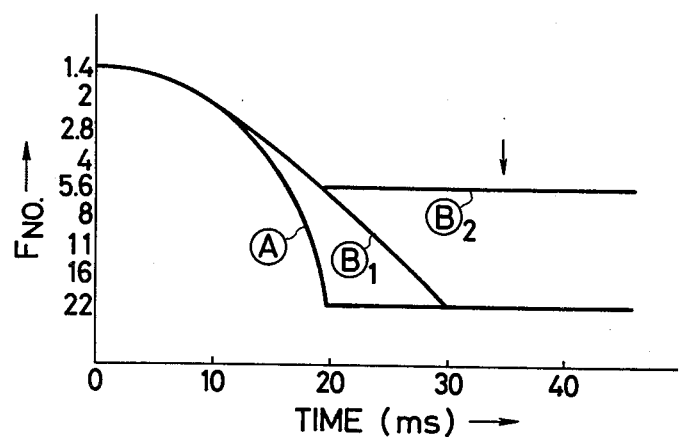
FIG. 5 is a graphical representation indicating various lens stopping-down curves at an ordinary temperature.
Figure 6:
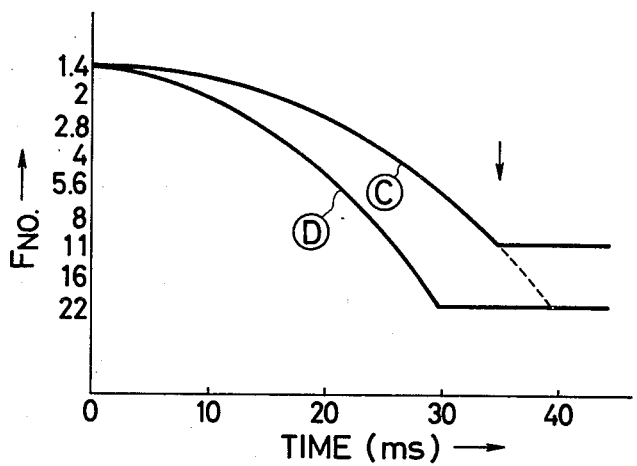
FIG. 6 is a graphical representation indicating various lens stopping-down curves at a low temperature.

The above-described aperture control operation is represented by a graphical representation in FIG. 5 which shows relations betweem time and aperture value into which light quantity variation in the light receiving element 63 is converted. In this case, the lens has, by way of example, a range from F1.4–F22. If the stopping-down operation is carried out only by the speed slowing mechanism, then the lens opening is changed from F1.4 to F22 in about 20 ms as indicated by the curve A in FIG. 6. However, it takes about 0.7 ms to change the lens opening from F16 to F22. In this case, the control accuracy is poor. Therefore, the auxiliary brake is utilized to change the aperture value from F1.4 to F22 in 30 ms as indicated by the curve $B_1$ in FIG. 5. In the case where the correct aperture value is F5.6, the control is effected at F5.6 as indicated by the curve $B_2$ in FIG. 5. Because the interlocking timer is set to 35 ms, in the case where aperture control is effectuated for F5.6, the aperture control is achieved in about 20 ms, to unlock the top curtain. In this case, the signal of the interlocking timer does not work.

In the case where, even if the aperture value is changed to F22, no correct aperture value can be obtained and the aperture control magnet is deenergized in 35 ms by the operation of the interlocking timer. The top curtain is then unlocked and run.

When the camera is operated at a low temperature such as about −30° C., the aperture blades will move more slowly because of, for instance, the viscocity of the oil applied thereto. Therefore, with the same lens as plotted in FIG. 5, the aperture value is changed from F1.4 to F22 in 40 ms as indicated by the curve C in FIG. 6. On the other hand, the supply of current to the aperture control magnet is interrupted by the interlocking timer in 35 ms, as described before, Accordingly, it is impossible to obtain an aperture value smaller than F11.

In order to overcome this difficulty, according to this invention, in the case of the ES or manual control operation in which the aperture value should be obtained as set, both of the interlocking timer and the auxiliary brake magnet are deenergized simultaneously so that the auxiliary brake is not applied.

A circuit to accomplish this result is shown in FIG. 7. With this circuit, a lens whose aperture opening is changed is indicated by curve C in FIG. 6. The lens aperture control can be achieved in 30 ms even at a low temperature such as −30° C. as indicated by the curve D in FIG. 6 because no auxiliary brake is applied. Accordingly, in the case of the ES or manual control operation, the photographing operation can be accomplished with a set aperture value even if it is a small aperture value such as F16 or F22.

The aforementioned circuit will now be described. Shown in FIG. 7 is the circuit, namely, an auxiliary brake control circuit according to this invention. Switches $SW_{ES-EE}$ and $SW_{A-M}$ are used to select camera control modes ES, EE and MANUAL. The selection combination is as indicated in FIG. 8. A switch $SW_U$ is turned off simultaneously when the lens stopping-down operation is started. As a result a time constant circuit comprising a capacitor C and a resistor $R_3$ is operated. Therefore, a voltage $V_c$ is developed across the capacitor C, which varies with the lapse of time as determined by:

$$V_c = (1 - e^{-\frac{1}{CR_3}t})V_{cc}$$

On the other hand, a supply voltage $V_{cc}$ is divided by resistors $R_4$ and $R_5$, to provide a reference voltage $$V_s = \frac{R_4}{R_4 + R_5} V_{cc}.$$

When the voltage $V_s$ and the voltage $V_c$ coincide with each other in a comparator CP, the comparator generates an output signal; that is, the output of the comparator CP is changed from a logical low level (L) to a logical high level (H).

The output of an AND circuit AND(2) is at "H" in the (EE) operation, and is at "L" in the ES or MANUAL operation. In the (EE) operation, the "H" signal of the AND circuit AND(2) is applied to an AND circuit AND(1), and the output of the comparator CP is raised from "L" to "H" in a time, set by the time constant circuit, after the start of the stopping-down operation. Therefore, the supply of current to a magnet Mg is interrupted a short time after the start of the stopping-down operation.

On the other hand, in the case of ES or MANUAL operation, the output signal of the AND circuit AND(2) is at "L" by the action of switches $SW_{ES-EE}$ and $SW_{A-M}$. Therefore, current is applied to the magnet, namely, the auxiliary brake magnet Mg independently of the output of the comparator CP at all times. Therefore, the auxiliary brake magnet does not work in this situation.

As described above, according to this invention, difficulties with the lens whose stopping-down operation is relatively slow at a low temperature, or to obtain an aperture value close to the minimum aperture value in the ES or manual exposure operation, can be eliminated merely by providing only one switch member which is adapted to change the time at which the auxiliary brake is applied, in the ES or manual exposure operation. It is apparent that other modifications of this invention are possible without departing from the essential scope of the invention.

We claim:

1. In an aperture auxiliary brake control device in a camera having a speed showing device operating association with a lens stopping-down operation, and the operation of said speed slowing device being terminated by interrupting a supply of current to an aperture control magnet to selectively employ various modes of operation including a shutter priority automatic exposure mode, the improvement comprising; a brake section for braking a brake disc secured to a part of said speed slowing device by interrupting the supply of current to an auxiliary brake magnet; and an auxiliary brake magnet control circuit, wherein in the shutter priority automatic exposure mode said brake disk is actuated prior to the operation of said speed slowing device being terminaled, and in other modes of operation the supply of current to said auxiliary brake magnet is interrupted following a predetermined period of time required to stop down the lens to a minimum aperture value thereof, whereby an auxiliary brake is selectively applied.

2. The apparatus of claim 1 wherein said control circuit comprises first switch means to select a camera mode of operation, second switch means response to initiation of a lens stopping-down operation, a time constant circuit in parallel with said second switch means, comparator means responsive to the output of said time constant circuit and logic means responsive to the output of said first switch means and said comparator to selectively interrupt the supply of current to said auxiliary brake magnet.

3. The apparatus of claim 2 wherein said logic means comprises a first AND gate responsive to the output of said first switch means and a second AND gate responsive to the output of said comparator and said first AND gate.

4. The apparatus of claims 1 or 2 wherein said camera is operable in both a manual and shutter priority mode of operation.

5. The apparatus of claims 1 or 2 wherein said camera is operable in both an aperture priority and shutter priority mode of operation.

6. The apparatus of claims 1 or 2 wherein said camera is operable in a manual, shutter priority and aperture priority mode of operation.

* * * * *